W. BANCROFT.
Cultivator.
No. 11,924. Patented Nov 14, 1854.
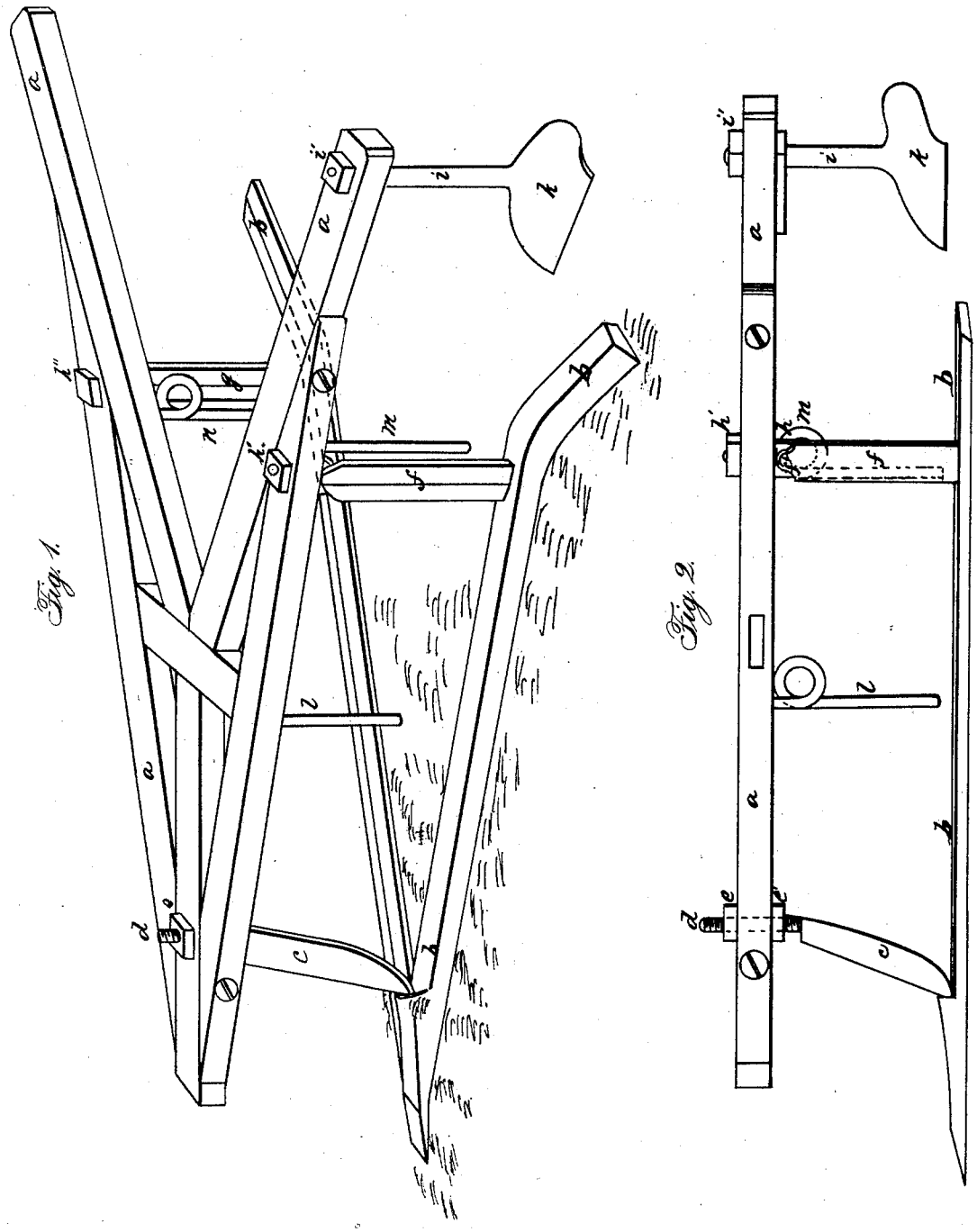
Witnesses:
Stephen Porter
J B Stout
Inventor:
William Bancroft

UNITED STATES PATENT OFFICE.

WILLIAM BANCROFT, OF WHITEFORD, OHIO.

IMPROVEMENT IN CULTIVATORS.

Specification forming part of Letters Patent No. 11,924, dated November 14, 1854.

*To all whom it may concern:*

Be it known that I, WILLIAM BANCROFT, of Whiteford, in the county of Lucas and State of Ohio, have invented a new and useful Improvement in Cultivators, of which the following is a specification.

To enable others skilled in the art to make and use my invention, I will proceed to describe its construction and operation, reference being had to the annexed drawings, forming a part of this specification, in which—

Figure 1 is a perspective view of my improvement. Fig. 2 is a side view of the same.

Similar letters refer to like parts.

$a$ is the frame of the cultivator; $b$, triangular-shaped knife; $c$, forward adjustable standard; $d$, adjusting-screw; $e$, adjusting-nut; $fg$, lower standards; $h$, hinges of the same; $h' h^2$, nuts; $ik$, adjustable plowshare; $i'$, adjusting-nut; $l m n$, spring-teeth.

In the construction of my improved cultivator I make the frame $a$ of the form seen in my drawings. To this frame the standards $c f g$ are attached, projecting downward. The lower parts of these standards fasten in the triangular knife $b$. This knife is made with a sharp edge all round. The standards are also sharpened on their front edges. The forward standard, $c$, hooks into the knife $b$ in the manner shown. The rear standards, $f g$, have hinges $f' h$, so that by means of the adjusting-screw $d$ and the adjusting-nut $e$ the forward standard, $c$, may be raised or lowered as desired, giving a corresponding adjustment to the forward end of the knife $b$.

In practice my cultivator passes along the surface of the ground, cutting off the weeds and separating the top of the earth in a thin slice. The depth of the slice is regulated by means of the adjusting-screw $d$ and the nut $e$.

When it is desired to make the knife cut deeper the standard $c$ is depressed, which sinks the point of the knife farther into the earth. The upper part of the standards $f g$ are secured to the frame by means of the nuts $h' h^2$.

To the central portions of the frame spring rake-teeth $l m n$ are attached. These serve to harrow the ground. They are made with springs to prevent any clogging. In passing over the ground my cultivator, as before stated, simply cuts off a slice of the earth, and thus destroys the weeds; but it does not turn a furrow. In order to throw up a furrow when desired, I attach a plowshare, $i k$, to the rear part of the frame, as shown, securing the same to the frame by means of the nut $i'$. I can, if desirable, have two of these plowshares, one on each end of the frame. This plowshare $i k$ is made adjustable by means of the nut $i'$, so that a furrow of greater or less depth may be turned, as may be desired.

In cultivating drilled crops it is very desirable to have some means of throwing up a furrow.

My improvement is cheap in construction and very effective in operation. It completely cuts off all weeds from the surface over which it passes, and forms a highly-valuable implement of assistance to all persons engaged in agricultural pursuits.

I am aware that a triangular knife like mine has been used; but

What I claim is—

The method of making the knife adjustable upon the frame $a$ by means of standard $c$ and hinged standards $f$ and $g$, as set forth.

WILLIAM BANCROFT.

Witnesses:
STEPHEN PORTER,
D. B. STOUT.